Aug. 25, 1931.     J. GAFNEY     1,820,062
RUNWAY FOR AIRPLANES
Filed Aug. 13, 1929
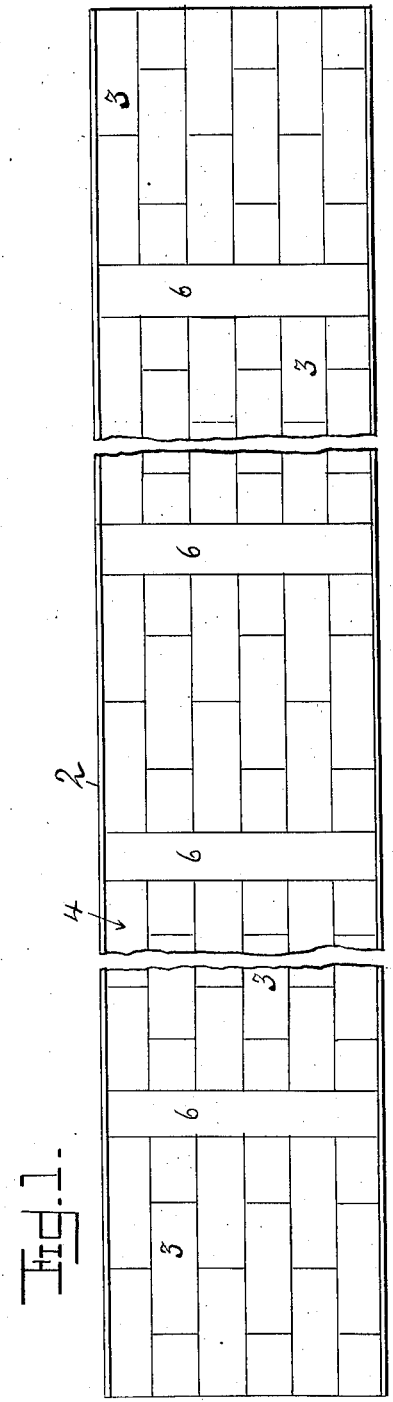
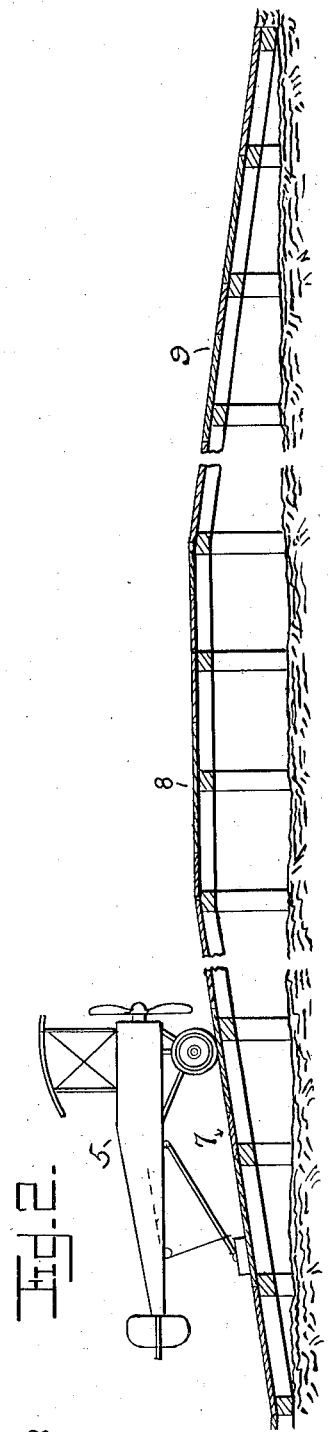
Inventor
James Gafney
By
Attorney Patented Aug. 25, 1931

1,820,062

UNITED STATES PATENT OFFICE

JAMES GAFNEY, OF NEW YORK, N. Y.

RUNWAY FOR AIRPLANES

Application filed August 13, 1929. Serial No. 385,530.

This invention relates to improvements in runways for airplanes and has for its object to provide a metallic runway formed partly of magnetic and partly of non-magnetic metal whereby the runway may be used either for landing or taking off, the magnetic portion of the runway being adapted to coact with magnetic brake shoes upon an airplane whereby the plane may be quickly stopped without jar.

A further object of the invention is to provide a metallic runway for airplanes which may be used for either landing or taking off with the least possible bumping and jarring.

With the above and such other objects in view as may hereinafter more fully appear, I have invented the device shown in the accompanying drawings in which:

Figure 1 is a plan view of my improved airplane runway;

Figure 2 is a side elevational view of a modification.

Like reference characters indicate like parts throughout the following specification, and in the several views in the drawings, in which 1 indicates a runway for airplanes, the surface 2 of which is formed of a series of steel plates 3, connected together in such a manner as to form a solid surface 4, upon which an airplane 5 may run either in taking off or landing. At certain intervals of the runway are provided transverse sections 6 of non-magnetic metal upon which the magnetic brake shoes of an airplane may be stopped in order that the magnetic affinity between this portion of the runway and the magnetic brakes of the airplane may be broken in order that the brakes may be raised into inoperative position.

From the above description it will be obvious that I have provided a metallic runway upon which airplanes may land and be stopped within a comparatively very limited space, and without the shocks incidental to landing on landing fields of the common type.

In Figure 2 I show a modification of the invention in which an upwardly inclined runway 7 leads to a horizontal platform 8, from which a downwardly inclined extension 9 is provided on the opposite side thereof. In this form of the invention the incline 7 is surfaced with steel plates 10 adapted to coact with the magnetic brake shoes on airplanes to break the speed of the plane upon landing the horizontal platform 8 being formed of non-magnetic material upon which the plane may run to release the brake shoes from the runway surface and the incline 9, also formed of non-magnetic material, will provide an incline from which the airplane may readily take off.

Having described my invention that which I claim to be new and desire to procure by Letters Patent is:

1. A runway for airplanes having a magnetic metal surface, non-magnetic sections provided in said runway, and extending transversely there-across.

2. A runway for airplanes having a magnetic metal surface, non-magnetic sections provided in said runway, and extending transversely there-across, said runway having a horizontal portion.

3. A runway for airplanes having a magnetic metal surface, non-magnetic sections provided in said runway, extending transversely there-across, said runway having a horizontal portion, and inclined extensions from either side of said horizontal portion.

4. A runway for airplanes having a magnetic metal surface, non-magnetic sections provided in said runway, extending transversely there-across, said runway having a horizontal portion, and inclined extensions from either side of said horizontal portion, one of said sides being formed of non-magnetic material.

5. The combination as described in claim 4, said horizontal portion being of non-magnetic material.

6. A runway for airplanes having one end magnetized and the other end non-magnetic, said ends being inclined.

7. A runway for airplanes having one end magnetized and the other end non-magnetic, said ends being inclined, and a horizontal intermediate portion.

8. A runway for airplanes having one end magnetized and the other end non-magnetic, said ends being inclined, a horizontal intermediate portion, having a non-magnetic surface.

9. A runway for airplanes having one end magnetized and the other end non-magnetic, said ends being inclined, a horizontal intermediate portion having a non-magnetic surface, and a non-magnetic strip spaced at intervals in said surface.

10. A runway for airplanes having its entire surface formed of metal, certain portions of which are magnetized and certain other portions of which are non-magnetized, said last portions being spaced apart, and inset in said magnetic surface.

11. A runway for airplanes having its entire surface formed of metal, certain portions of which are magnetized and certain other portions of which are non-magnetized, said last portions being spaced apart, and inset in said magnetic surface, and extending entirely across said runway.

12. The device as claimed in claim 11, the ends of said runway being inclined.

13. The device as claimed in claim 11, the ends of said runway being inclined, the central portion of said runway being horizontal.

14. The device as claimed in claim 11, the ends of said runway being inclined, the central portion of said runway being horizontal, one of said ends being magnetic.

15. The device as claimed in claim 11, the ends of said runway being inclined, the central portion of said runway being horizontal, one of said ends being magnetic, and the other of said ends being non-magnetic.

In testimony whereof I affix my signature.

JAMES GAFNEY.